(12) United States Patent
Gleinser

(10) Patent No.: US 7,100,901 B2
(45) Date of Patent: Sep. 5, 2006

(54) TENSION RATCHET WITH A BELT MAGAZINE, AND BELT MAGAZINE

(76) Inventor: Gerhard Gleinser, Obere Riedl 4, D-82395 Obersochering (DE)

( * ) Notice: Subject to any disclaimer, the term of this patent is extended or adjusted under 35 U.S.C. 154(b) by 324 days.

(21) Appl. No.: 10/312,398
(22) PCT Filed: Jun. 28, 2001
(86) PCT No.: PCT/EP01/07369
§ 371 (c)(1), (2), (4) Date: Jan. 27, 2003
(87) PCT Pub. No.: WO02/00467
PCT Pub. Date: Jan. 3, 2002

(65) Prior Publication Data
US 2003/0111650 A1 Jun. 19, 2003

(30) Foreign Application Priority Data
Jun. 28, 2000 (DE) .................... 200 11 328 U
Oct. 10, 2000 (DE) ..................... 100 50 005

(51) Int. Cl.
*B25B 25/00* (2006.01)
*B65H 75/28* (2006.01)

(52) U.S. Cl. ............... 254/218; 254/213; 254/214; 254/217; 254/223; 254/382
(58) Field of Classification Search ............ 254/213, 254/214, 217, 218, 223, 382
See application file for complete search history.

(56) References Cited
U.S. PATENT DOCUMENTS

| 4,622,721 | A | * | 11/1986 | Smetz et al. ........... 24/68 CD |
| 5,560,086 | A | * | 10/1996 | Huang ................... 24/68 CD |
| 5,611,520 | A | | 3/1997 | Soderstrom |
| 6,102,371 | A | * | 8/2000 | Wyers ..................... 254/218 |
| 6,547,218 | B1 | * | 4/2003 | Landy .................... 254/217 |
| 6,609,275 | B1 | * | 8/2003 | Lin ....................... 24/68 CD |

FOREIGN PATENT DOCUMENTS
DE 195 44 932 C 5/1997

* cited by examiner

Primary Examiner—Emmanuel Marcelo
Assistant Examiner—Evan H Langdon
(74) Attorney, Agent, or Firm—Birch, Stewart, Kolasch & Birch, LLP (57) ABSTRACT

The invention relates to a tension ratchet with a belt magazine, for rapidly fixing a good to be transported to a vehicle, an object to a support, or several objects to each other. The tension ratchet (30) is combined with a belt magazine (1) which receives the entire idle belt supply during use and during storage and ensures rapid tying down/releasing of e.g. a transport load, due to constant availability for use; as well as tidy storage. The belt magazine (1) is arranged in such a way that it lies flat on the lower arm of the tension ratchet (30) in order to reduce the construction height, with a vertical belt winding up shaft (15) for receiving a belt to be wound up in horizontal rotation. The belt runs into the tension ratchet out of the belt magazine on its back side in the winding position, rotates about 90° in said tension ratchet and is then led out through the load tensioning roller (8).

42 Claims, 4 Drawing Sheets

TENSION RATCHET WITH A BELT MAGAZINE, AND BELT MAGAZINE

This application is the national phase under 35 U.S.C. § 371 of PCT International Application No. PCT/EP01/07369 which has an International filing date of Jun. 28, 2001, which designated the United States of America.

This invention relates to a tensioning ratchet with belt magazine for holding a tie-down strap. Such a tensioning ratchet is known from Patent Specification DE 195 44 932 C1, for example.

The tensioning ratchet disclosed therein makes it possible to roll up the inactive tie-down strap in the belt magazine, both during operation and when storing the tensioning ratchet. A similar type of arrangement describes a belt magazine for tensioning ratchets, and was disclosed in Patent Specification DE 43 91 184 T1.

Tensioning ratchets with belt magazines have considerable advantages in comparison to conventional tensioning ratchets. For example, the belt required for tying down a product to be transported is only pulled out of the belt magazine, slung around the product to be transported, secured by a hook to a suitable location, e.g., an elevating tailgate, and immediately be tied down. The leftover belt not used for tying down remains protected in the belt magazine. After use, the belt is wound back in the magazine within a few seconds, so that the tensioning ratchet is ready for further use at any time. In addition to the associated longer life of the belt due to less wear, on-demand operational availability and both simple and convenient handling of the tensioning ratchet, one crucial advantage in commercial applications has to do with the major savings in time required for tying down/untying. This time advantage was put at a factor of 8 in tests, and, in addition to those circumstances already mentioned above, results from the fact that a loosely stored belt of 8 or more meters in length becomes easily knotted up or fouled with other belts or objects when handled. Therefore, renewed use must first be preceded by a time-consuming and nerve-wracking process of untying knots. Leaving that out of consideration, the tensioning ratchet according to the invention with belt magazine requires considerably less storage area than a tensioning ratchet with loose belt. The cumbersome process of threading the loose end of a belt into the load-tensioning roller of a conventional tensioning ratchet after slinging it around a product to be transported is omitted entirely in a tensioning ratchet with belt magazine, along with the ensuing required process of pulling the entire excess length of the belt through the latter. In particular in tensioning ratchets with several stoppers distributed around the load-tensioning roller to break up the torque, or in tensioning ratchets with incrementally detachable locking mechanism, the threading of the loose end of the belt into the load-tensioning roller is often purported to be a test of patience. In addition, tensioning ratchets with belt magazine do not involve securing or knotting the end of the belt that hangs out loosely from conventional tensioning ratchets and otherwise flaps around during transport, which in turn involves an additional step prior to loosening and removing the tensioning ratchet.

Despite several persuasive advantages, conventional tensioning ratchets with belt magazine have the crucial disadvantage that the overall height of the belt magazine increases considerably with the length of the belt. Already a belt length of 5 meters exceeds the original overall height of the tensioning ratchet required for this purpose, in part by more than twofold. This fact is hard to tolerate at least in the area of transportation, since the tensioning ratchets are often used on the outside of truck walls, and longer belts at a simultaneously lower overall height are simultaneously required.

Proceeding from this disadvantage, the object of the invention is to make as flat a tensioning ratchet with belt magazine as possible.

This object is achieved by the tensioning ratchet with the belt magazine according to the subject matter of independent claim 1. The subclaims, description and drawings contain advantageous features, forms of execution, aspects and supplements.

In addition, the invention provides a belt magazine according to the independent claim 42.

In a preferred aspect of the invention, a tensioning ratchet with belt magazine is proposed for winding up a non-active stock of a tensioning belt, in which the tensioning ratchet contains a load tensioning roller and an actuator for the latter, the belt magazine has a belt winding device, and the belt winding device has a winding axis that runs essentially perpendicular to the axial direction of the load tensioning roller, preferably in the at least one belt guide, which transfers the belt from one plane to a plane essentially perpendicular thereto. The winding axis is the direction in which the loading belt is wound around the belt magazine.

It makes sense for the belt winding device to have a belt winding shaft onto which the belt can be wound, wherein the belt winding shaft can best be actuated by a crank handle.

In an advantageous form of execution of this variant, the load-tensioning roller is rotatably mounted between a lower arm and a tension lever.

In this case, locking wheels positively connected with the load tensioning roller are provided at one, preferably at both external sides of the lower arm and tension lever, wherein at least one stopper is provided in the lower arm and/or in the tension lever, which can be made to interact with the locking wheels in such a way that one stopper serves to advance the load tensioning roller, and hence wind or tension the belt while opening and closing the tension lever, while the other one prevents the load tensioning roller from turning back.

It is especially favorable if the belt magazine lies flat relative to the tensioning ratchet (i.e., twisted from vertical to horizontal), wherein the belt can be rolled horizontally on a belt-winding shaft situated vertically in the belt magazine.

At least the one stopper can advantageously be moved in guide slits provided in the lateral walls of the lower arm and tension lever, wherein the at least one stopper is advantageously resiliently pressed against the at least one locking wheel.

In a preferred aspect of the invention, it is proposed that the belt magazine be arranged flat and offset by 90° C. relative to the tensioning ratchet with translatory belt guide. In other words, instead of the previously known vertical orientation relative to the tensioning ratchet, and hence purely translatory belt guide, the belt magazine is now horizontally oriented, and arranged with a translational belt guide rotating at 90°. In this case, the belt secured in the belt magazine and to be wound into the belt magazine rotating horizontally is passed between two belt guides vertically arranged in the area of the transition between the belt magazine and tensioning ratchet proceeding from the belt winding shaft in the belt magazine, and, translationally exiting it, guided out of the tensioning ratchet at a 90° rotation through the load tensioning roller.

In order to guide the belt as smoothly and with as little friction as possible, the distance between the two belt guides relative to the load tensioning roller of the tensioning ratchet is selected as a function of the belt width, belt thickness and material consistency. A preferably spring-loaded stopper is best situated in the lower arm of the tensioning ratchet, whose job is to prevent the load-tensioning roller from turning back, at a radial angle to the load-tensioning roller. This angle is advantageously equal to or greater than the angle of the rotated belt guide between the load tensioning roller and the belt guides. Depending on the type of belt, this angle beneficially measures about 15° between the load tensioning roller and belt guides. In addition, in order to shorten the stopper, the spring loading, which in generic tensioning ratchets takes the form of a helical spring in the extension of the latter, and hence under certain conditions significantly influences the path of the rotated belt guide, can take place below the stopper with an annular spring, making it possible to shorten the entire tensioning ratchet depending on the type of belt material to be used.

The overall height of a tensioning ratchet without belt magazine is influenced by its technical structure and design load. In addition to a more massive structural design, corresponding belts of greater width and thickness are required with increasing tensioning ratchet capacity. The average overall height of a tensioning ratchet therefore roughly corresponds to the width of the required belts.

Proceeding from these overall heights, the invention is based on the idea of enhancing tensioning ratchets with a belt magazine, wherein the original overall height of the tensioning ratchet is exceeded only negligibly if at all taking into account the respective design load, and hence represents a significant advantage relative to previously known tensioning ratchets with belt magazine.

The length of the tension lever is also preferably dimensioned as a function of the design load of a tensioning ratchet in order to introduce the necessary torque into the tensioning ratchet. By contrast, the lower arm of a tensioning ratchet can be kept relatively short, since it lies in a tie-down strand. This circumstance can also be utilized according to the invention in that the belt magazine ties directly to the lower arm of the tensioning ratchet. When closed, the tension lever can come to lie over a considerable length of the belt magazine, thereby giving rise to a compact structure.

Advantageous here is, on the one hand, the high capacity of the belt magazine, wherein belt lengths of 8 or 10 meters, respectively, or more can be accommodated without any problem and, on the other hand, that the length of this combined device will not assume either disruptive or unwieldy dimensions. A tensioning ratchet with belt magazine based on the design according to the invention can be harmonically incorporated into the tie-down strand despite a high belt receiving capacity.

Claims 10 to 12 relate to a rotatably mounted belt winding shaft passed through the middle of the belt magazine on the floor and upper part of the belt magazine with a crank handle secured to its upper side to wind the belt into the belt magazine. A spring arrangement can also be used to draw the belt into the belt magazine instead of the crank handle.

In claims 13 to 15, two bolts connecting the floor and upper part of the belt magazine in a dimensionally stable manner with overlying, rotatably mounted sleeves for guiding the belt are arranged in the boundary area between the belt magazine and the lower arm of the tensioning ratchet. As an alternative, the belt guides can also consist of lengthened and inwardly molded lateral parts of the lower arm of the tensioning ratchet or intermittently bent lateral brackets of the floor and upper part of the belt magazine, which simultaneously are used to secure the belt magazine to the lower arm of the tensioning ratchet.

Claim 16 illustrates the belt progression between the aforementioned belt guide and load tensioning roller of the tensioning ratchet, wherein the belt passes between the two belt guides, rotating as it exits them by 90° in its translatory running path, and ends in the load tensioning roller of the tensioning ratchet, so that the belt is available after leaving the latter in a conformant position relative to supporting the product to be transported.

According to the translatory and rotary belt guide in the area between the belt guide and load tensioning roller, low-friction belt transport is only enabled if, according to claim 17, preferably the stopper is situated in the lower arm of the tensioning ratchet at a radial angle to the load tensioning roller corresponding at least to the angle of the belt that is passing by. Also advantageous according to claims 18 and 19 is that the stopper is spring-loaded in the direction of the locking wheel not by placing a helical spring in the extension of the stopper, but arranging it on the lower side on the side facing the lower arm of the tensioning ratchet, and the helical spring is replaced by an annular spring mounted in one of the two lateral parts of the lower arm for reasons having to do with space and assembly between the stopper and the floor wall of the lower arm. Taking into account the minimum required rotary path of the belt guide, a stopper shortened in this way makes it possible to cut the distance between the belt guide and load tensioning roller, which results in a shortening of the entire arrangement comprised of the tensioning ratchet and belt magazine.

For the locking mechanism in the tensioning ratchet to be able to withstand maximal forces, it is favorable according to claim 20 if the stoppers in the lower arm and tension lever engage the locking wheels in an as radial and shape-conforming manner as possible.

To secure the tensioning ratchet to a loading wall, a second, generally short piece of belt is best provided, whose one end has a connecting means, e.g., hook, and whose other end is secured to the traverse at the end of the belt magazine according to claim 21. According to the variant in claim 22, the belt is secured to the traverse of the belt magazine by means of a kind of chain link, wherein the chain link is anchored so that it cannot move using a bracket pressed out of the traverse of the belt magazine.

Claims 23 to 26 relate to another preferred way to accommodate a second belt, wherein the two fork ends of an essentially U-shaped strap have short ends bent inwardly at an angle of somewhat more than 90°, which are routed through boreholes in the lateral walls of the lower arm, and attached on the inside of the lower arm by means of securing elements, e.g., screw nuts, splints or compression, so that they cannot slide out. Since the belt in the entry area of the strap ends slides by in nearly a vertical position in the middle of the tensioning ratchet, it is best to make sure that the strap ends do not extend too far inside the lower arm. The further progression is advantageously such that the strap is shaped at a slight angle shortly after exiting the lateral walls of the lower arm so that the strap comes to lie against the lower casing of the tensioning ratchet, on the one hand, but does not collide with the belt rolled up on the belt magazine, on the other hand. In another expedient design, the strap extends until behind the end of the belt magazine, so that the overall height of the tensioning ratchet can be further minimized. The strap pivoted to the lower arm of the tensioning ratchet combines two advantages: On the one hand, the belt magazine is not incorporated into the tie-down strand, so that material twisting under a load is minimized, and a better adjustment of the device to the substrate takes place. On the other hand, the strap can be swivelled down, so that the tensioning ratchet can be handled like a pistol, and the belt can here be easily pulled out of the magazine or rolled up.

Claim 27 proposes that the lower arm of the tensioning ratchet be formed as a single piece with the belt magazine. In this case, the intermittently bent upper part of the belt magazine can instead be secured by means of rivets, screws, welds or another attachment means not described in any greater detail. This type of execution minimizes the assembly costs, saves on material and ensures a robust and dimensionally stable combination without additional connecting elements.

In order to be able to retrofit commercially available tensioning ratchets with a belt magazine, a belt magazine with production-conformant connecting elements is provided in another preferred embodiment of the invention according to claim 28. Claim 29 provides a belt magazine as an alternating chassis, wherein a tensioning ratchet can be fitted with various belt lengths, depending on the requirements existing at the time.

In tensioning ratchets, in particular heavy-duty ratchets, it is sometimes hard to remove the belt from the load tensioning roller after slackened if the loose transported product no longer exerts any tensile force on the tensioning ratchet, but several windings of belt still remain on the load tensioning roller, and the load tensioning roller is sluggish or jammed. The load-tensioning roller can often only be turned back by pulling vigorously on the belt, which cannot always be accomplished without using suitable tools. To this end, claim 30 advantageously provides for securing a rotating clasp on the load-tensioning roller of the tensioning ratchet on at least one external side. This makes it possible to manually turn the load-tensioning roller to the release position of the tensioning ratchet with the stoppers not in the engaged position with the locking wheels.

In order to prevent the belt from winding off the belt magazine or a belt loop from exiting the belt magazine, in particular during transport, the expedient forms of execution of the invention described in claims 31 to 35 provided that the tension lever of the tensioning ratchet extends into the rotating area of the crank handle of the belt winding shaft in a closed state, thereby preventing the crank from turning back over this area. As an alternative, a recess is provided in the tension lever, wherein the tension lever encompasses the crank. To allow the crank handle to continue turning up to this position even when the belt has already been tightly rolled up in the belt magazine, it is proposed that the crank handle be connected with the belt winding shaft in the belt magazine via a sliding clutch, a spring mechanism or the like. Another type of execution proposes that the crank handle or its grip be foldable, retractable or detachable, wherein the belt-winding shaft can as a result be locked to prevent it from turning back. Also conceived is an arrangement that prevents the belt from too easily rolling out of the belt magazine, since the belt in the belt magazine can be excessively wound, and hence becomes jammed, when the belt is jerked out of the tensioning ratchet. To prevent the belt of the aforementioned type from being excessively wound, a belt brake is provided, in which a type of shim arranged in the belt magazine, or a flat spring arranged between the crank and belt magazine casing, generates a sufficient grinding, and hence braking, effect.

Claims 37 to 39 show variants of the invention in which the belt is rigidly connected with the belt-winding shaft in the belt magazine. A belt stopper in the form of a clamp or the like is here secured to the belt, and is spaced apart from the belt winding shaft, whose dimensions are such that sufficient residual belt is on hand to brace the transported product during complete utilization of the belt stock owing to the bilaterally retracting load tensioning roller in the tensioning ratchet. It must here be taken into account that the belt stopper has a larger diameter than the through slit in the load tensioning roller, so that the belt can only be pulled out of the load tensioning roller of the tensioning ratchet up to the belt stopper. As a result, the two belt guides according to claim 13 are also to be spaced apart to each other enough for the belt stopper to pass the latter unimpeded.

According to claim 40, the tensioning ratchet with belt magazine can expediently be prevented from automatically loosening when used under severe conditions, even given extremely high vibrations. To this end, the lower arm of the tensioning ratchet accommodate locking lugs situated on either side over the bearing eyes of the load tensioning roller and in the radial swiveling area of the stopper in the tension lever. These are situated in such a way that the tension lever with manually retracted stopper can be moved over these locking devices into its idle position, wherein the stopper is released, engaging in back of this locking device into the locking wheels, while the side brackets of the tension lever grip the stopper in the lower arm, which also is engaged with the locking wheels, from the back, so that the tensioning ratchet is completely locked within itself.

In order to make tensioning ratchets with belt magazine accessible for as wide a range of users as possible, it is beneficial to design tensioning ratchets with belt magazine according to 41 in compliance with varied requirements. For example, there can be various locking mechanisms with or without incremental return of the load tensioning roller, several stoppers for distributing the torque on the load tensioning roller, or branch-specific add-ons on the tensioning ratchet, e.g., a floor plate with extruded, fixed hook. There can also be devices that provide an internal or external lock for locking the unit, as a safeguard against theft or the like.

The subject matter of the invention is explained in greater detail based on the embodiments shown in the following drawings. Shown in.

Figure 1:
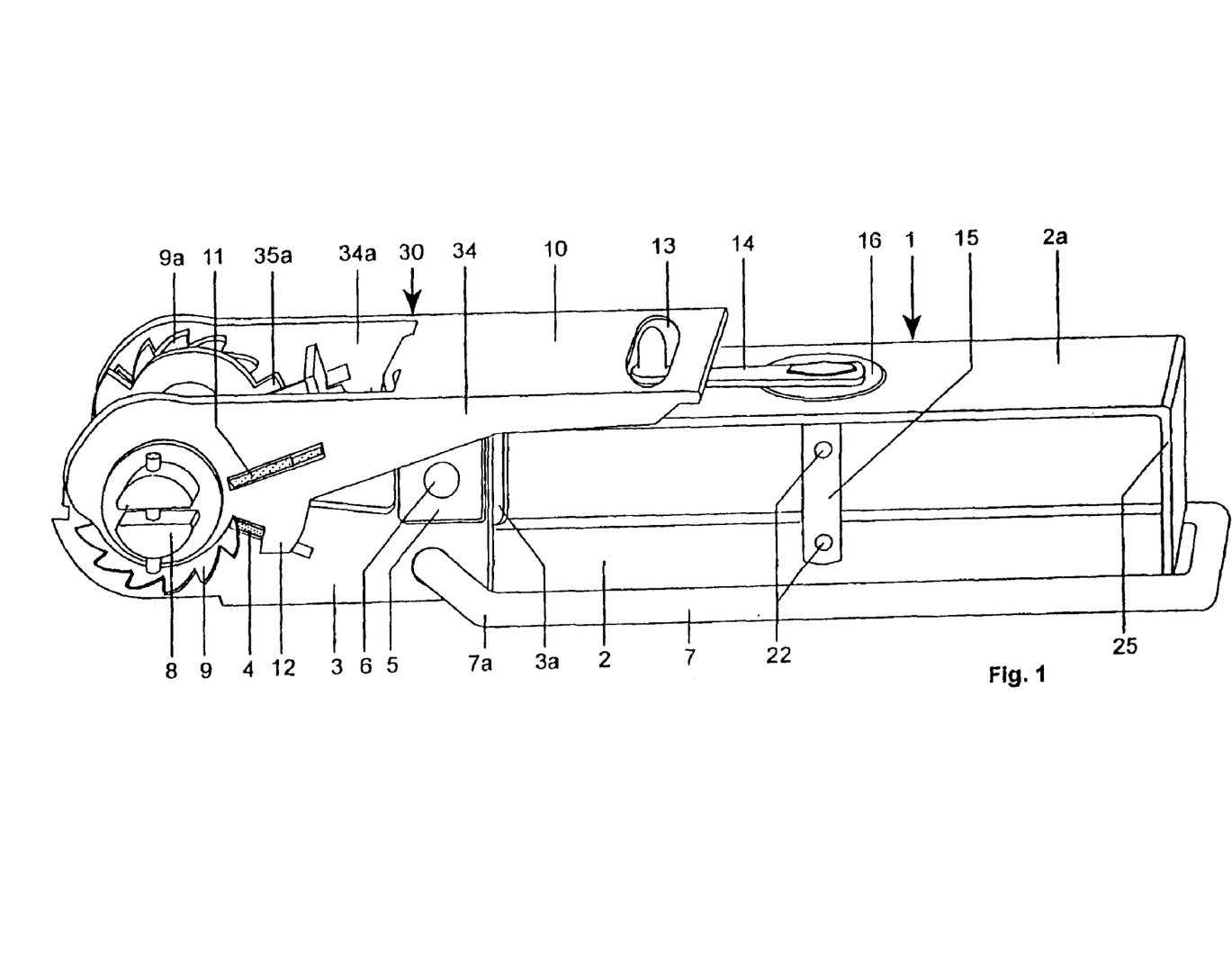
FIG. 1 is a perspective view of a tensioning ratchet with belt magazine according to the invention.

The tensioning ratchet 30 with belt magazine 1 shown on FIG. 1 has a floor part 2 with lateral walls 3, 3a forming the lower arm of the tensioning ratchet and the belt magazine, a stopper 4 moveably mounted therein in guide slits and spring mounted in the direction of the locking wheel 9, 9a, an upper part 2a running parallel to the floor part 2, which is preferably intermittently bent in the shape of a U from the extension of the floor part 2 over a traverse 25, attachment flanges 5, 5a, which have boreholes 6, 6a for receiving attachment means, e.g., rivets, and join the upper part 2a with the lateral walls 3, 3a in a dimensionally stable manner.

The tensioning ratchet 30 with belt magazine also contains a strap 7, which is pivoted in boreholes in the lateral walls 3, 3a and has bends 7a, 7b, a load tensioning roller 8 rotatably mounted in the lateral walls 3, 3a and 34, 34a and positively connected with the locking wheels 9, 9a, a tension lever 10 with a stopper 11 movably mounted in guide slits, which is made to engage the locking wheels 9, 9a by a spring, and is used to drive the load tensioning roller 8.

In addition, the tensioning ratchet 30 with belt magazine contains a side bracket 12, 12a present on each of the lateral walls 34, 34a to grip the stopper 4 from behind when the later is engaged with the locking wheels 9, 9a, a recess 13 situated in the transverse connection of the tension lever 10 for locking the crank handle 14, which is connected with the flat spring 16 and a belt winding shaft 15 so that it cannot rotate. The belt-winding roller 15 preferably contains boreholes 22 for securing a belt. The flat spring 16 rubs against the upper part 2a as the crank handle 14 turns, and exposes the belt winding shaft 15 to a braking action.

Figure 2:
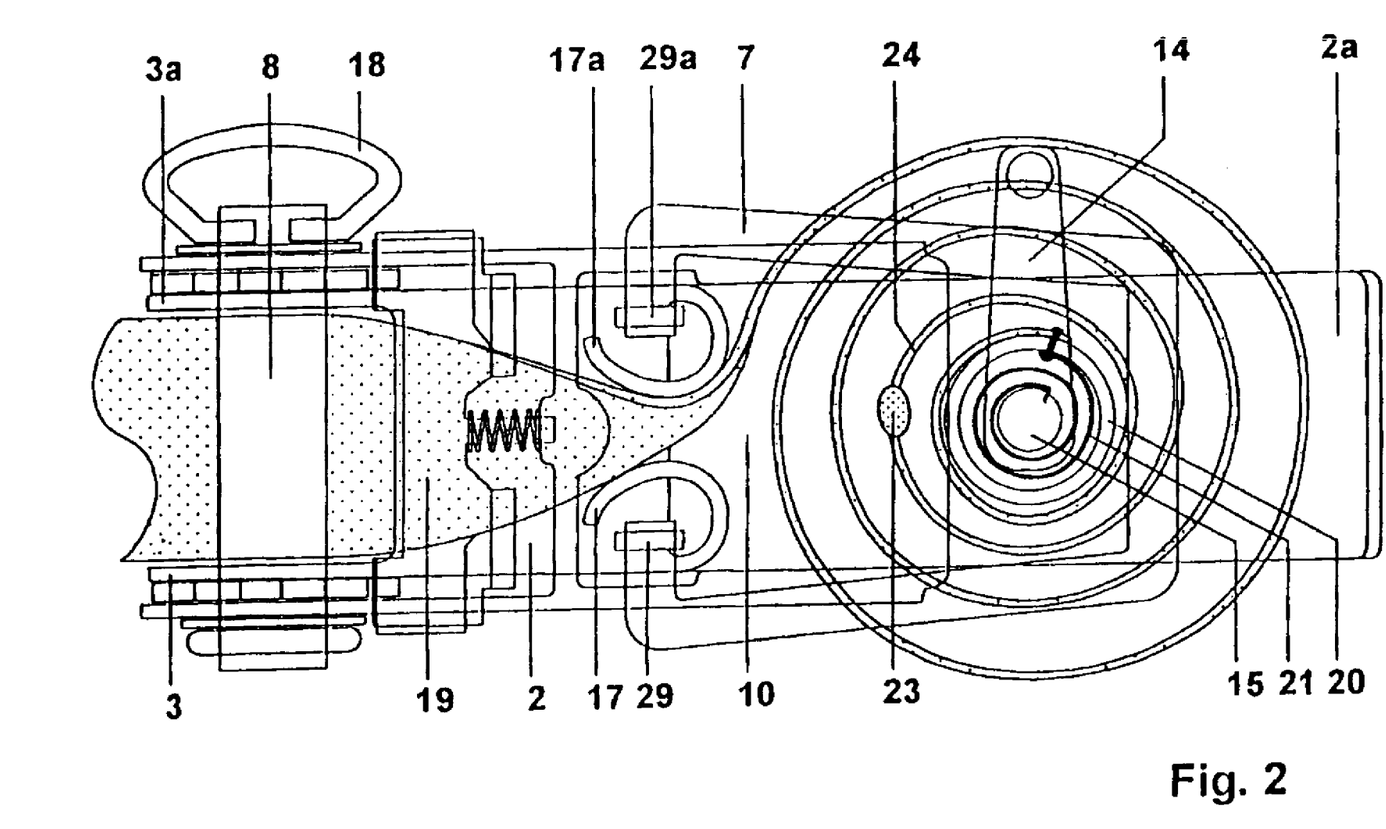
FIG. 2 is a transparent top view of a tensioning ratchet with belt magazine.

The "transparent" top view of a tensioning ratchet with belt magazine shown on FIG. 2 reveals how the belt is situated and guided, along with other details outlined in the description. The belt guides 17, 17a can consist of elongated and inwardly molded or rolled-in areas, respectively, of the lateral walls of the floor part 2. Situated on an external side of the load tensioning roller 8 is a rotating clasp 18, with which the load tensioning roller 8 can be manually returned to the release position of the tension lever 10. The belt 19 is introduced from outside through a slit in the load tensioning roller 8 into the tensioning ratchet, rotated 90° out of its central plane, glides by the stopper 4 between the two belt guides 17, 17a and into the belt magazine 1, and is there provided with a clamp 23 and connected with a belt segment 24 secured to a hollow shaft 20. This hollow shaft is connected by a spring 21 with the belt winding shaft 15, which is passed through the upper part 2a, mounted so that it can rotate, and connected with the crank handle 14. With the belt tightly rolled up, the crank handle 14 can also be moved by the spring 21 until over the location where the tension lever 10 engages or up to its recess 13, and be locked against turning back by the latter.

Figure 3:
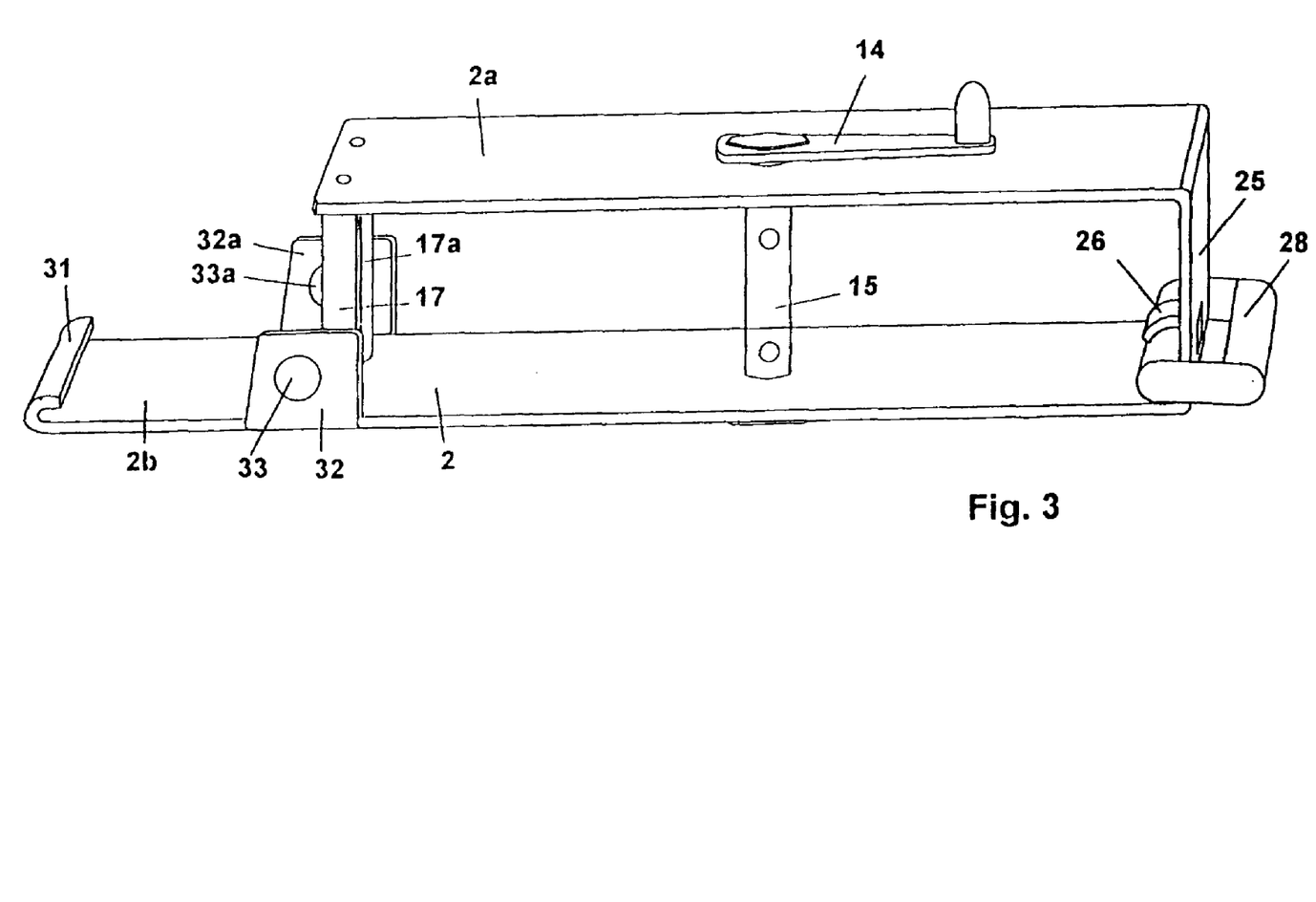
FIG. 3 is a perspective view of a belt magazine for securing to commercially available tensioning ratchets.

The single belt magazine shown in FIG. 3 is used to retrofit a commercially available tensioning ratchet without belt magazine. It has structurally conformant attachment parts, e.g., a floor part 2 elongated by an area 2b with snapped on hook connector 31 and side brackets 32, 32a, which are provided with boreholes 33, 33a. The belt guides 17, 17a are preferably made out of massive bolts that connect the floor part 2 with the upper part 2a in a dimensionally stable manner. An attachment part 28 held by the traverse 25 and fixed by a bracket 26 is provided to attach a second belt 27.

Figure 4:
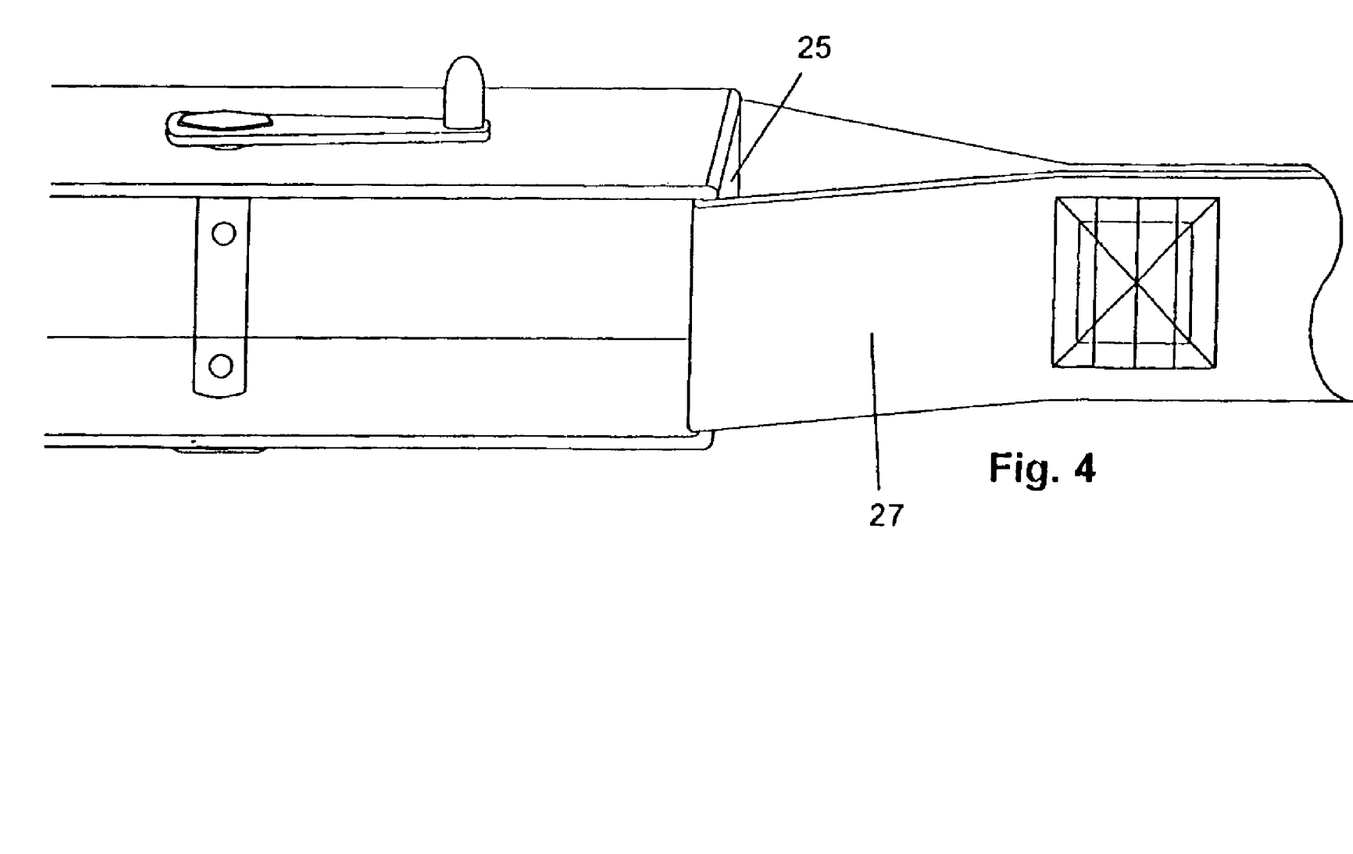
FIG. 4 is a partial view of a variant of the belt magazine in which the second belt is secured to its casing end.

FIG. 4 shows a partial section of a belt magazine similar to that of FIG. 3, in which the second belt 27 is secured around the traverse 25 of the belt magazine.

As evident from FIGS. 1 and 2, the overall height of the tensioning ratchet can be reduced according to the invention by having the axial direction, i.e., winding axis, in the example shown the rotational axis, of the belt winding roller 15 run essentially perpendicular to the axial direction of the load tensioning roller 8, and the belt trunk leading to or from the belt winding roller 15 passes through a belt guide 17 between the load tensioning roller 8 and belt winding roller 15, which causes the belt 19 to rotate by 90°.

In a preferred aspect of the invention, a tensioning ratchet is provided with a belt magazine, essentially comprised of a load tensioning roller, which is rotatably mounted between a lower arm and a tension lever, and whose two external sides have locking wheels that are positively connected with the load tensioning roller, at least one stopper each in the lower arm and tension lever, which are spring-loaded to move them in guide slits in the lateral walls and engage the locking wheels, wherein one stopper is sued as the tension lever opens and closes to advance the load tensioning roller, and hence to wind or tension the belt, and the other prevents the load tensioning roller from turning back, as well as a belt magazine with a shaft rotatably mounted in its lateral parts and provided with a crank handle for winding up the non-active belt stock, wherein belt magazine 1 is arranged flat relative to the tensioning ratchet 30 (i.e., twisted out of the vertical into the horizontal), wherein the belt can be rolled horizontally on a belt winding shaft 15 situated vertically in the belt magazine.

| REFERENCE LIST | |
|---|---|
| 1a | Belt magazine |
| 2 | Floor part |
| 2a | Upper part |
| 3 | Lateral wall, lower arm |
| 3a | Lateral wall, lower arm |
| 4 | Stopper, lower arm |
| 5 | Side bracket, upper part |
| 5a | Side bracket, upper part |
| 6 | Borehole, side bracket |
| 7 | Strap |
| 7a | Strap bend |
| 8 | Load tensioning roller |
| 9 | Locking wheel |
| 10 | Tension lever |
| 11 | Stopper, tension lever |
| 12 | Flank, lateral wall, tension lever |
| 13 | Recess, tension lever |
| 14 | Crank handle |
| 15 | Belt winding shaft |
| 16 | Flat spring |
| 17 | Belt guide |
| 18 | Rotating clasp |
| 19 | Belt |
| 20 | Hollow shaft |
| 21 | Spring |
| 22 | Boreholes, belt-winding shaft |
| 23 | Belt stopper |
| 24 | Belt segment |
| 25 | Traverse |
| 26 | Locking mechanism, attachment part |
| 27 | Second belt |
| 28 | Attachment part |
| 29 | Securing means, strap |
| 30 | Tensioning ratchet |
| 31 | Hook connector |
| 32 | Side bracket |
| 33 | Boreholes, side bracket, floor part |
| 34 | Lateral part, tension lever |
| 35 | Locking lugs |

What is claimed is:

1. A tensioning ratchet with belt magazine for winding up a non-active stock of a tensioning belt, in which the tensioning ratchet contains a load tensioning roller and an actuator for the latter, and the belt magazine has a belt winding device, characterized in that the belt winding device has a winding axis that runs substantially perpendicular to the axial direction of the load tensioning roller.

2. A tensioning ratchet with belt magazine for winding up a non-active stock of a tensioning belt in which the tensioning ratchet contains a load tensioning roller and an actuator for the latter, and the belt magazine has a belt winding device, characterized in that the belt winding device has a winding axis that runs substantially perpendicular to the direction of the load tensioning roller, characterized by at least one belt guide that transfers the belt from one plane to one substantially perpendicular thereto.

3. The tensioning ratchet according to claim 1, characterized in that the belt-winding device contains a belt-winding shaft on which the belt can be wound.

4. The tensioning ratchet according to claim 1, characterized in that the belt-winding shaft can be activated by a crank handle.

5. The tensioning ratchet with belt magazine according to claim 1, characterized in that the load-tensioning roller is rotatably mounted between a lower arm and a tension lever.

6. The tensioning ratchet with belt magazine according to claim 5, characterized in that locking wheels positively connected with the load tensioning roller are provided at least on one, preferably both, external sides of the lower arm and the tension lever, wherein at least one stopper is provided in the lower arm and/or in the tension lever, and can be made to interact with the locking wheels in such a way that one stopper serves to advance the load tensioning roller, and to wind or tension the belt while opening and closing the tension lever, while the other one prevents the load tensioning roller from turning back.

7. The tensioning ratchet with belt magazine according to claim 1, characterized in that the belt magazine lies flat relative to the tensioning ratchet (i.e., twisted from vertical to horizontal), wherein the belt can be rolled horizontally on a belt winding shaft situated vertically in the belt magazine.

8. The tensioning ratchet with belt magazine according to claim 6, characterized in that the at least one stopper can be moved in guide slits provided in the lateral walls of the lower arm and tension lever.

9. The tensioning ratchet with belt magazine according to claim 8, characterized in that the at least one stopper is resiliently pressed against the at least one locking wheel.

10. The tensioning ratchet with belt magazine according to claim 1, characterized in that the belt winding shaft is rotatably mounted in the middle of the belt magazine in casing parts and provided with a crank handle.

11. The tensioning ratchet with belt magazine according to claim 1, characterized in that the belt-winding shaft is rotated by a spring-actuated drive means.

12. The tensioning ratchet with belt magazine according to claim 1, characterized in that the belt winding shaft has attachment means, e.g., boreholes, or a through slit for securing the belt and, respectively.

13. The tensioning ratchet with belt magazine according to claim 1, characterized by two belt guides spaced apart from each other.

14. The tensioning ratchet with belt magazine according to claim 2, characterized in that the belt guides comprise the lateral parts of the lower arm, or of the lateral brackets of the casing parts, or of two bolts connecting the casing parts in a dimensionally stable manner.

15. The tensioning ratchet with belt magazine according to claim 2, characterized in that the belt guides have rotatably mounted sleeves or sliding rollers.

16. The tensioning ratchet with belt magazine according to claim 13, characterized in that the belt is rotated by 90° between the belt guides and the load-tensioning roller.

17. The tensioning ratchet with belt magazine according to claim 6, characterized in that the stopper is situated at a radial angle to the load tensioning roller, which corresponds to or exceeds the angle of the rotated belt progression between the load tensioning roller and the belt guides.

18. The tensioning ratchet with belt magazine according to claim 6, characterized in that the stopper is spring-loaded on its lower side facing the floor part in the direction toward the locking wheel.

19. The tensioning ratchet with belt magazine according to claim 18, characterized in that the spring-loading takes place with a flat spring mounted in the lateral part, respectively.

20. The tensioning ratchet with belt magazine according to claim 6, characterized in that the stoppers engage the locking wheels in a radial and shape-conforming manner.

21. The tensioning ratchet with belt magazine according to claim 2, characterized in that a second belt is secured to a traverse, and the other end of the belt has a connection means, e.g., a hook.

22. The tensioning ratchet with belt magazine according to claim 21, characterized in that an attachment part with a locking mechanism is secured to the traverse for attaching a second belt.

23. The tensioning ratchet with belt magazine according to claim 5, characterized by a strap pivoted in the lateral walls for attaching a second belt.

24. The tensioning ratchet with belt magazine according to claim 23, characterized in that the strap extends out beyond the traverse.

25. The tensioning ratchet with belt magazine according to claim 23, characterized in that the strap is substantially U-shaped, and has bends.

26. The tensioning ratchet with belt magazine according to claim 23, characterized in that the strap has securing means at its two ends extending through the lateral walls into the inside of the lower arm to prevent sliding out.

27. The tensioning ratchet with belt magazine according to claim 1, characterized in that the lower arm of the tensioning ratchet is designed as a single piece with the belt magazine.

28. The tensioning ratchet with belt magazine according to claim 1, characterized in that the belt magazine is detachable, and has production-conformant connecting elements for attachment to the tensioning ratchet, preferably a floor part extended by with a hook connector and two side brackets provided with mounts for connecting elements.

29. The tensioning ratchet with belt magazine according to claim 28, characterized in that the belt magazine can be secured to and again removed from a tensioning ratchet as a kind of replacement magazine.

30. The tensioning ratchet with belt magazine according to claim 1, characterized by a rotating clasp secured to at least one external side of the load tensioning roller for manually advancing or returning the load tensioning roller.

31. The tensioning ratchet with belt magazine according to claim 6, characterized in that the tension lever extends into the active radius of the crank handle in a closed position in such a way as to prevent the belt winding shaft from turning back.

32. The tensioning ratchet with belt magazine according to claim 6, characterized by a recess in the tension lever that makes it possible to lock a crank handle therein with the tension lever closed.

33. The tensioning ratchet with belt magazine according to claim 32, characterized in that a crank handle is coupled with a belt winding shaft via a sliding clutch, spring mechanism or the like in such a way that the crank handle can be moved further out of any position at least to a locking position with the residual belt wound tight, e.g., the recess in the tension lever, and can be locked there against turning back.

34. The tensioning ratchet with belt magazine according to claim 32, characterized in that the crank handle and its grip, respectively, is foldable, retractable or detachable.

35. The tensioning ratchet with belt magazine according claim 34, characterized in that the belt-winding shaft can be locked against turning back.

36. The tensioning ratchet with belt magazine according to claim 1, characterized in that the belt winding device or the belt wound thereon is exposed to a rotating braking action in the belt magazine, e.g., by means of a flat spring that is connected with the belt winding shaft so that it cannot rotate, and grinds against the upper part under a pressure.

37. The tensioning ratchet with belt magazine according to claim 1, characterized in that the loose belt end of the belt is secured to the belt-winding device in the belt magazine.

38. The tensioning ratchet with belt magazine according to claim 1, characterized in that a belt stopper is secured on the belt between the belt-winding device and the load tensioning roller spaced apart from the belt winding device, whose diameter is greater than the slit in the load tensioning roller.

39. The tensioning ratchet with belt magazine according to claim 38, characterized by a distance between the belt guides that exceeds the diameter of the belt stopper.

40. The tensioning ratchet with belt magazine according claim 6, characterized in that the stopper engages behind locking lugs into the locking wheels with the tension lever closed, and grips the flanks of the stopper from behind while it is engaged with the locking wheels.

41. The tensioning ratchet with belt magazine according to claim 1, characterized in that the tensioning ratchet further comprises locking mechanisms with incremental return of the load tensioning roller, or a device for securing an internal or external lock.

42. A belt magazine for a tensioning ratchet consisting of a belt winding shaft for a belt band, a mount for securing the belt magazine to a tensioning ratchet and a belt guide to turn the belt band removed from the belt winding roller by about 90°.

* * * * *